United States Patent [19]

James et al.

[11] Patent Number: 5,841,989

[45] Date of Patent: Nov. 24, 1998

[54] SYSTEM AND METHOD FOR EFFICIENTLY ROUTING DATA PACKETS IN A COMPUTER INTERCONNECT

[75] Inventors: David V. James, Palo Alto; Glen D. Stone, San Jose, both of Calif.

[73] Assignee: Apple Computer, Inc., Cupertino, Calif.

[21] Appl. No.: 631,634

[22] Filed: Apr. 8, 1996

[51] Int. Cl.$^6$ ...................................................... G06F 13/00
[52] U.S. Cl. ....................................................... 395/200.69
[58] Field of Search ........................ 364/DIG. 2, DIG. 1; 395/200.3, 200.48, 200.51, 200.65, 200.68, 200.69, 200.71, 200.72; D15/310

[56] References Cited

U.S. PATENT DOCUMENTS 3,748,647  7/1973  Ashany et al. ........................... 395/310

Primary Examiner—Robert B. Harrell
Attorney, Agent, or Firm—Sawyer & Associates

[57] ABSTRACT

A method and system for efficiently routing data packets in a computer interconnect includes a plurality of nodes forming a ringlet, generally including two connections between each pair of nodes configured to allow communication in either direction between each pair of nodes. One sequence of such connections forms a run moving,-for example left-to-right between a series of nodes. The other sequence of connections forms a right-to-left run. Selected nodes are configured to provide two cross-over paths, each from one run to the other, so the two runs are linked to form a circle or ringlet. One or more selected nodes provide an optional connection between the two runs, thus allowing a fast path or short cut to the opposing run. A fast path may include a uni- or bidirectional cross through path in an intermediate node. In one preferred embodiment, a single node can provide both cross-over paths, but can also support a cross-between path for each run, allowing a packet to continue on the same run, rather than the default path that crosses over to the opposite run. The method and system includes data information in a packet that can be used to decide whether to switch the packet through a fast path or to let it continue on the "normal" path. Routing decisions are based on a path field within each packet. This field is updated when taking a faster path (for example, a cross-through or cross-between path). The update techniques allow data packet path lengths to be reduced, while also providing a packet-aging capability. A scrubber is provided to manage packet aging and to remove packets that have not been removed from the ringlet but are no longer useful.

13 Claims, 15 Drawing Sheets

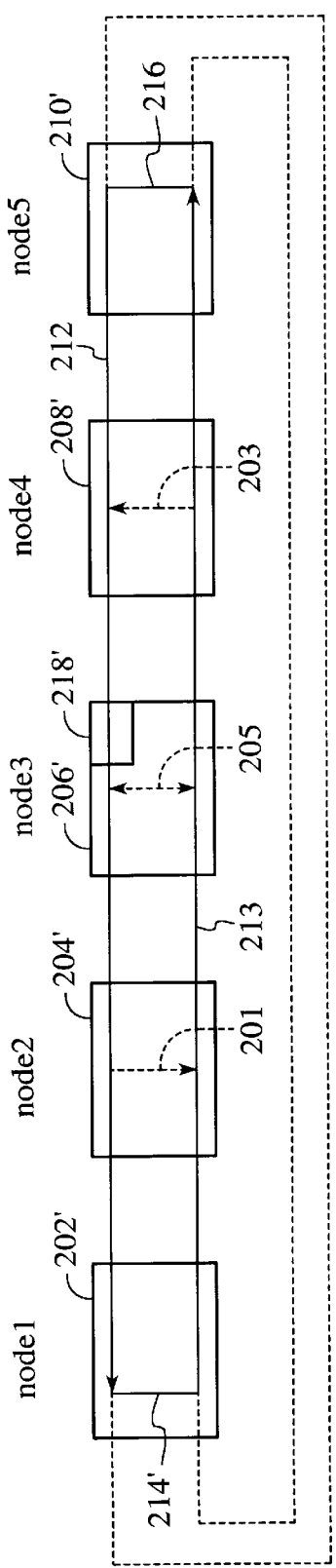
FIG. 5
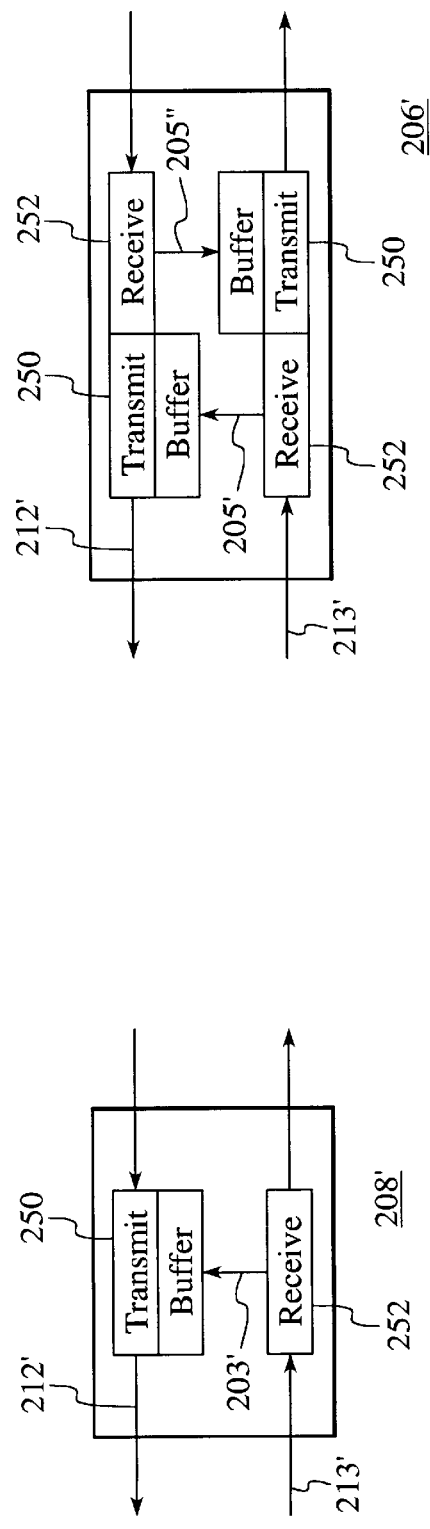
FIG. 6B
FIG. 6A

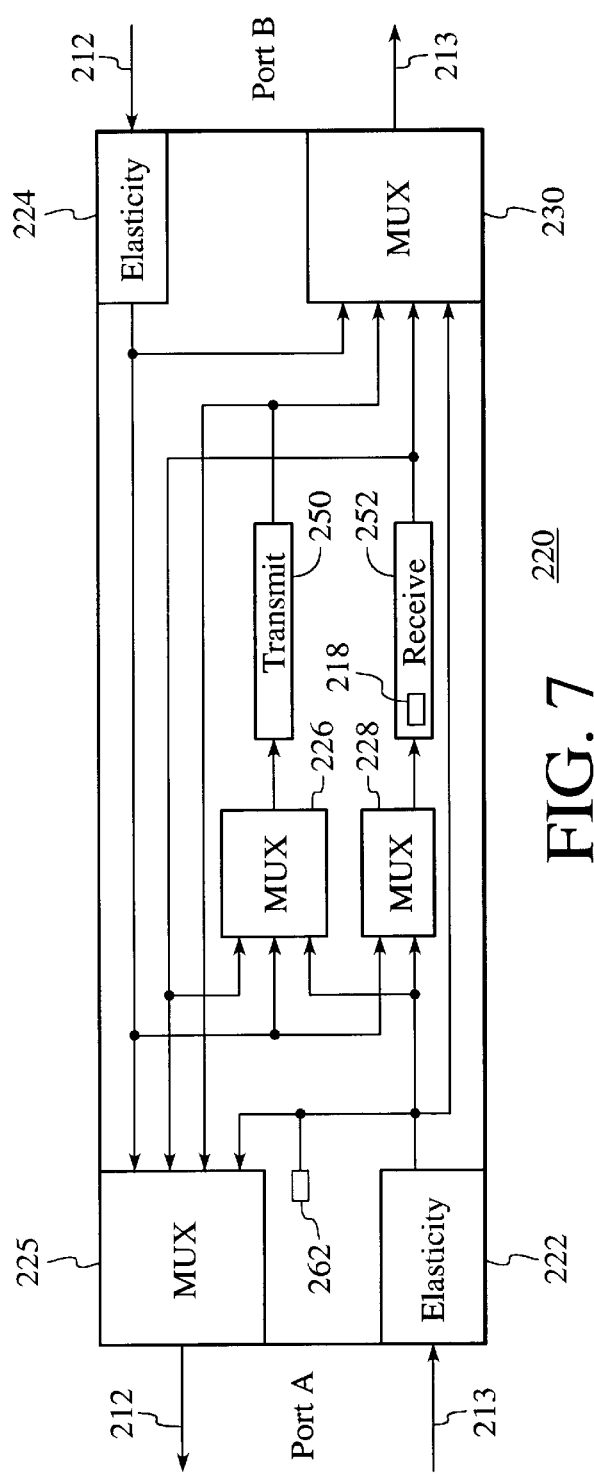
FIG. 7
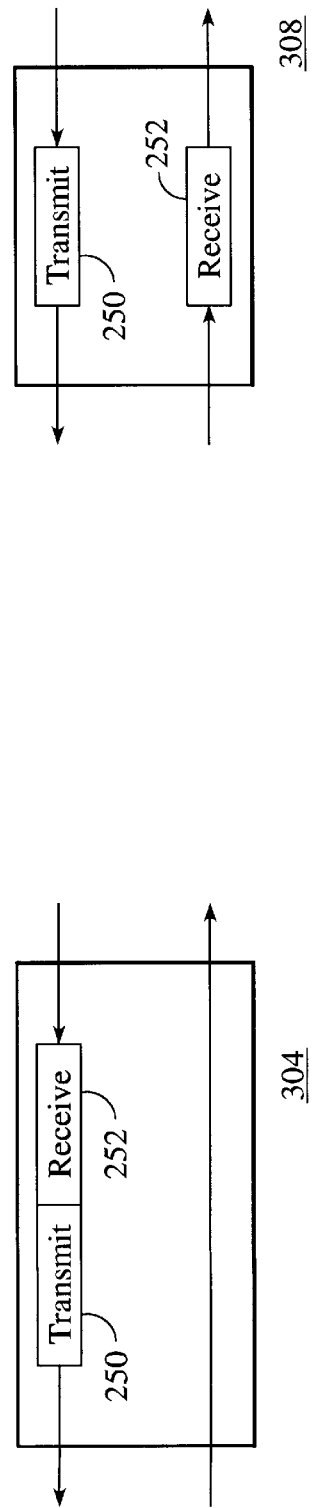
FIG. 8B
FIG. 8A

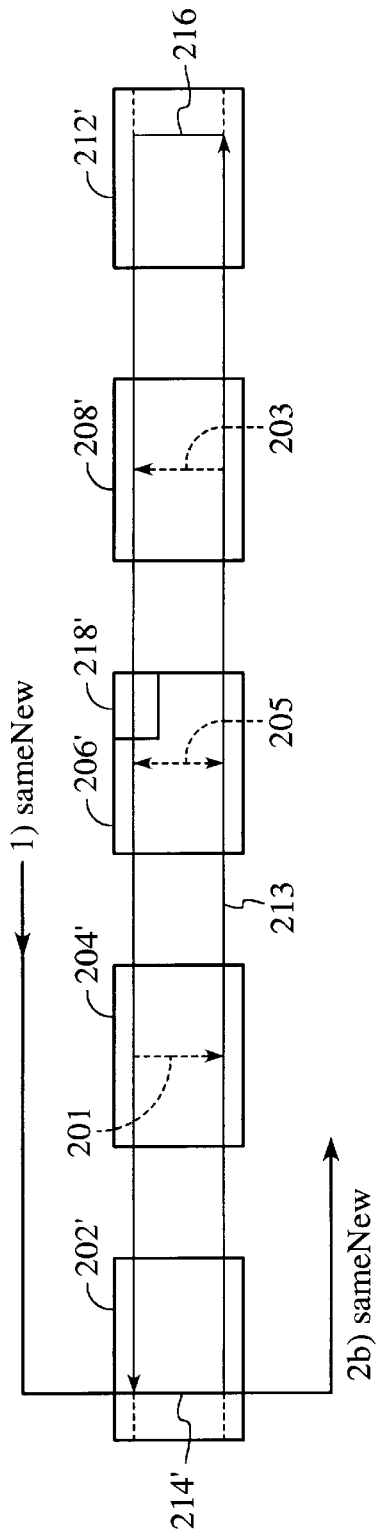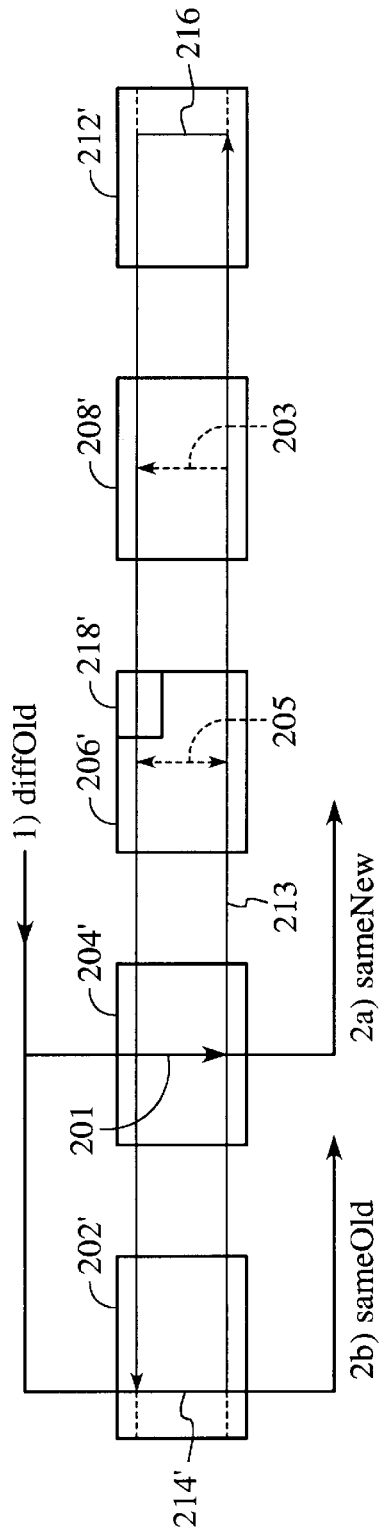

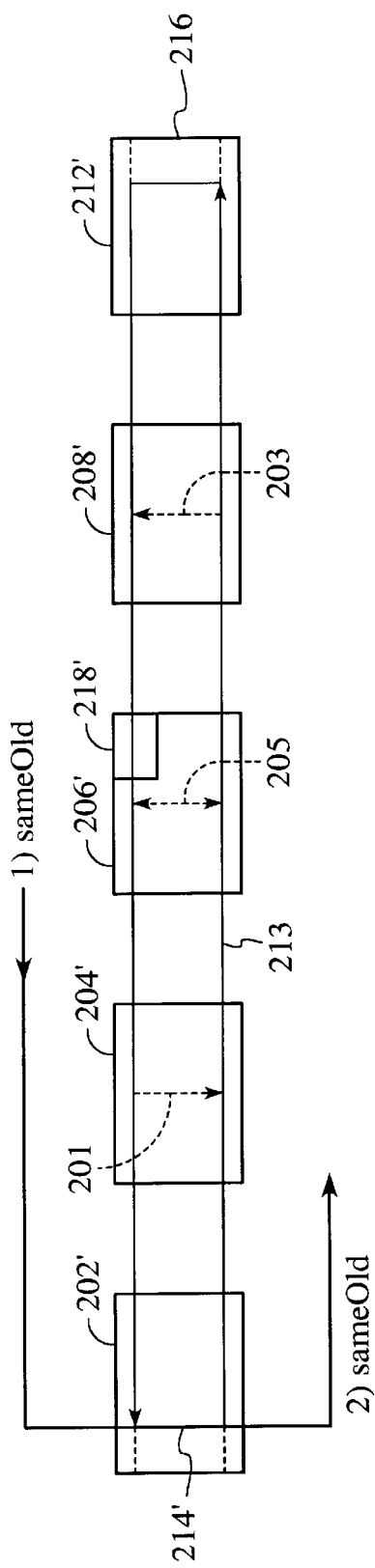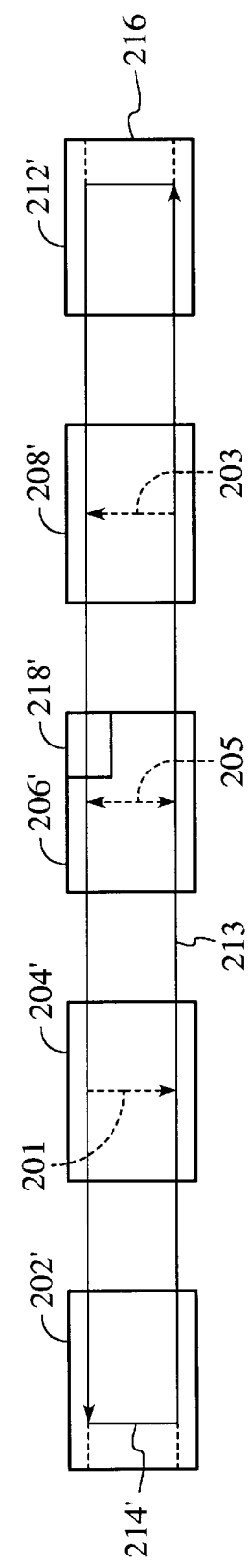
FIG. 15
FIG. 16

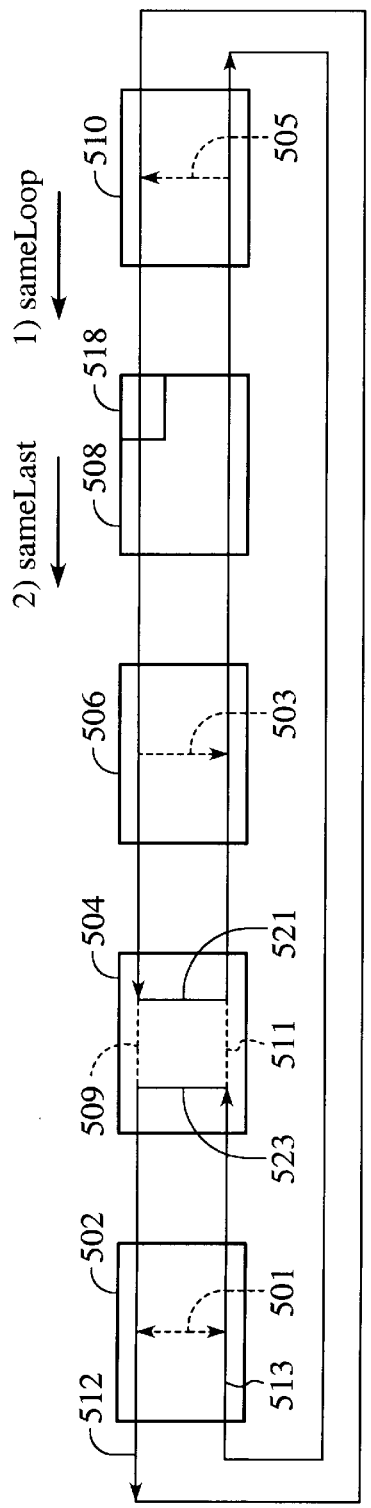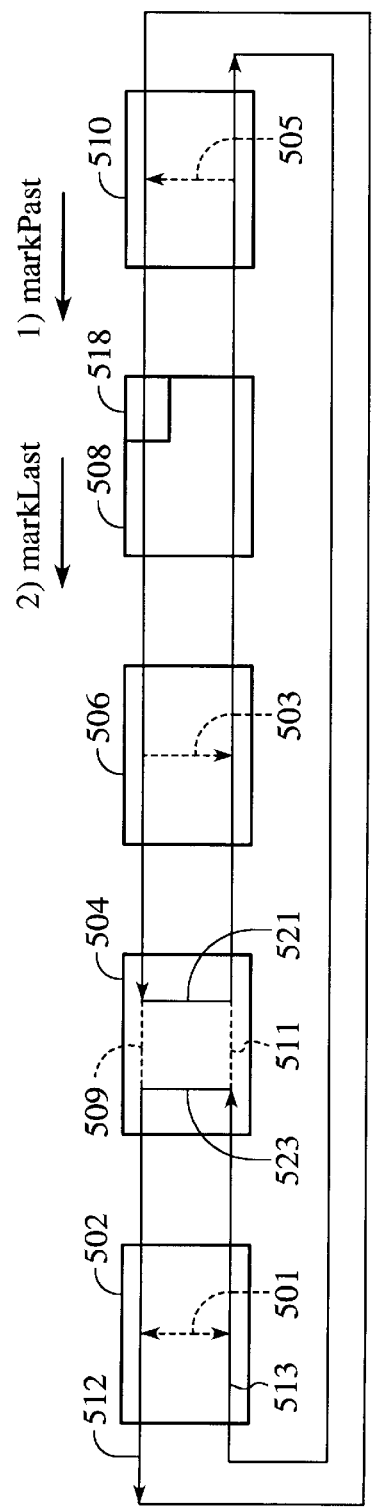
FIG. 27A
FIG. 27B

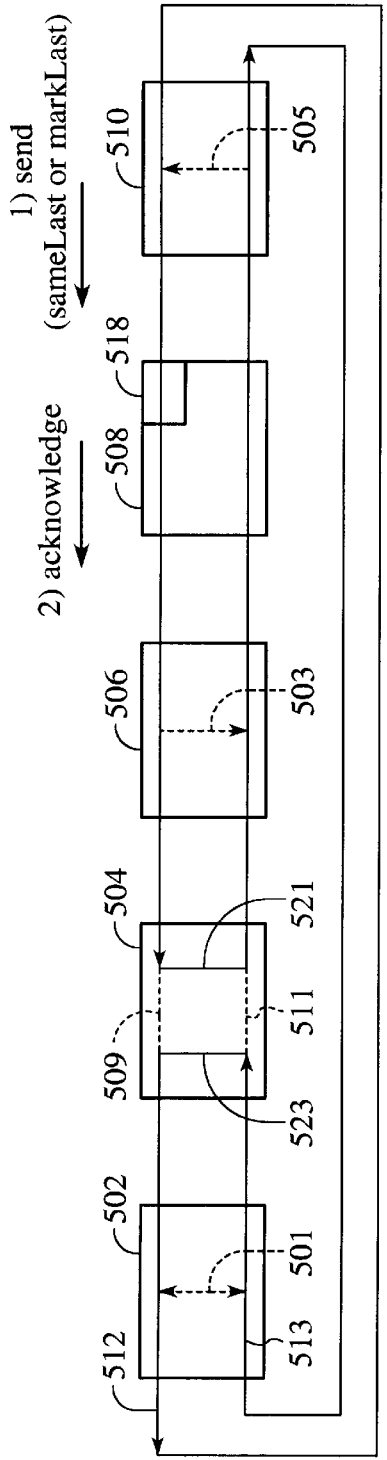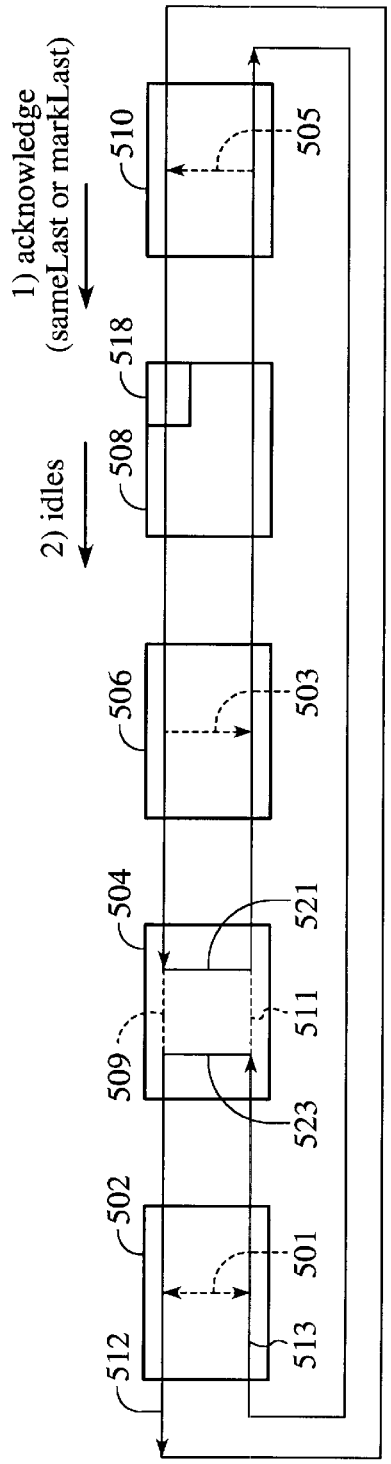

SYSTEM AND METHOD FOR EFFICIENTLY ROUTING DATA PACKETS IN A COMPUTER INTERCONNECT

FIELD OF THE INVENTION

The present invention is directed to an improvement in the transmission of data packets in a computer interconnect and more particularly the efficient routing of such data packets in ringlets utilized in such interconnects.

BACKGROUND OF THE INVENTION

A computer interconnect allows for the connection of a plurality of devices in a processing system. A typical computer interconnect could be, for example, a serial bus which provides connections for a plurality of processors and peripheral devices. A high speed, low cost serial bus can be utilized advantageously as a peripheral bus or a backup to parallel backplane bus. Such a serial bus is defined, for example, in industry standard IEEE Std 1394–1994, "A High Performance Serial Bus". This serial bus is used to connect up to 63 nodes, providing computer bus-like communication facilities between nodes. Some of the important features of a serial bus in accordance with the above-identified specification include:

a. Automatic and dynamic assignment of node addresses—no need for address switches.

b. The bus supports read and write transactions as done on a backplane bus as well as supporting an "isochronous" data transfer mode which provides a low-overhead guaranteed bandwidth service.

c. A fair bus access mechanism that guarantees all nodes equal access.

d. The serial bus only allows one data packet to be sent at a time and that packet is broadcast to all nodes that might be listening. Arbitrating for the right to send this packet takes a relatively long period of time with respect to a bit transmission time. Therefore, large packets are sent to improve efficiency.

A similar function but higher speed and longer distance computer interconnect is desired. However, a different style of computer interconnect is desired so that the same efficiency can be obtained without increasing packet size.

A ring based interconnect, similar to the IEEE Std 1596–1992 Scalable Coherent Interface (SCI), allows smaller packets to be efficiently sent within such higher bandwidth and longer distance connections. The present invention relates to a mechanism for improving the efficiency of packets by additionally reducing the distance as measured in cable hops between nodes over which the packet is sent on such ring-like interconnects.

These features are described in the context of the serial implementation of point to point interconnects that provide bus-like services, such as SCI. It is understood that many of the above features would have application in many types of communications interconnects.

To further describe the background of the present invention, we use the term ringlet instead of ring because the total number of nodes connected to each ringlet is expected to be small (less than 64 nodes). Larger topologies could consist of multiple ringlets connected together through an electronic circuit such as a bridge or packet switch.

Point-to-point interconnects provide bus-like services by connecting multiple components, called nodes, with links. In the present specification, a node is defined as an addressable entity which can be independently identified and independently addressed. It is preferred that each node can be independently reset.

Transactions are used to communicate between nodes. A transaction has two subaction components: request and response. The request transfers address and commands (and for writes, data); the response returns status (and for reads, data). Request and response packets normally travel between nodes referred to as a producer and a consumer. Intervening nodes simply forward a packet without modification. A producer creates a request or response packet, addressed to the consumer, and sends it over the bus. The consumer recognizes and removes the packet and substitutes a smaller acknowledge packet in its place, addressed to the original producer. The acknowledge packet returns from the consumer to the producer where the acknowledge packet is removed. The acknowledge packet is utilized to confirm the successful acceptance of the original packet.

Simple point-to-point interconnects can be configured in ringlet topologies. A simple ringlet has one link between each pair of nodes, connected to form a complete circle.

Redundant versions of this use cables containing bidirectional links, so that a ringlet can still be successfully formed when one of the cables is unconnected or broken. Such techniques are used on serial copper Serial Storage Architecture (SSA), serial-fiber FDDI, and parallel-copper interconnects designed by Cray Computers, Inc. (the SCX channel, presented at the IEEE Computer Society sponsored, Hot Interconnect 3 Conference at Stanford, Calif. 1995). When all cables are connected, that is, each node is connected to two other nodes in the ringlet, two counter-rotating ringlets can be formed, as shown in FIG. 1.

The counter rotating ringlet structure allows for twice the packet bandwidth of a single ringlet and allows slower response packets to be sent in the shortest (clockwise or counterwise) direction. Although this counter rotating ringlet system more efficiently utilizes the request/response-packet bandwidth, the per-node costs are higher than for a conventional single ringlet structure because this architecture must allow for two instances of transceivers (including buffers and control logic (not shown)) in each node. Also, in this ringlet structure acknowledge packets cannot be returned on the other ringlet, which would typically provide a shorter path.

Two counter-rotating ringlets 12 and 14 are shown in FIG. 1. Such techniques are used in serial on serial fiber FDDI and the parallel copper SCX interconnect. In the case of SCX, each node 18 has two sets of transmit/receive logic (transceivers 20), so that the most-direct packet-transmission path can always be used.

Within such a topology, node1-to-node2 request/response packets normally would be sent on ringlet 12 and node1-to-node4 packets would be sent on ringlet 14, to minimize latency and reduce the hop-bandwidth consumption. Request/response packet-transit distances are reduced in two ways: (1) the shortest path can be taken and (2) the overall size of each of the ringlets 12 and 14 is small (the number of cable hops is no larger than the number of nodes).

Rather than using a counter-rotating ring, a simpler more cost-effective solution is desired. Such a solution should allow either request/response or acknowledge packets to use optional routing for maximum efficiency. Such routing can be facilitated by providing multiple rings plus ring hopping so that a packet can move toward its target along the shortest available path. This solution should allow for simple conventional nodes as well as enhanced nodes, and should be applicable to a set of nodes daisy chained in a linear fashion, i.e. the first and last nodes not being directly connected to each other. The present invention addresses such a need.

SUMMARY OF THE INVENTION

A method and system for efficiently routing data packets in a computer interconnect is disclosed. The method and system includes a plurality of nodes forming a ringlet, generally including two connections between each pair of nodes configured to allow communication in either direction between each pair of nodes. One sequence of such connections forms a run moving, for example left-to-right between a series of nodes. The other sequence of connections forms a right-to-left run. Selected nodes are configured to provide two cross-over paths, each from one run to the other, so the two runs are linked to form a circle or ringlet. One or more selected nodes provide an optional connection between the two runs, thus allowing a fast path or short cut to the opposing run. A fast path may include a uni- or bidirectional cross through path in an intermediate node. In one preferred embodiment, a single node can provide both cross-over paths, but can also support a cross-between path for each run, allowing a packet to continue on the same run, rather than the default path that crosses over to the opposite run.

The method and system includes data information in a packet that can be used to decide whether to switch the packet through a fast path or to let it continue on the "normal" path. Routing decisions are based on a path field within each packet. This field is updated when taking a faster path (for example, a cross-through or cross-between path). The update techniques allow data packet path lengths to be reduced, while also providing a packet-aging capability. A scrubber is provided to manage packet aging and to remove packets that have not been removed from the ringlet but are no longer useful. The present invention can be utilized advantageously to support simple nodes while the cross-through and cross-between paths can improve performance over conventional ringlet architecture.

It is an object of this invention to provide alternate paths within a topology to allow for the shortest possible path between two nodes.

It is a further object of this invention to provide a mechanism for efficiently routing packets within a system with alternate paths.

These and other aspects of the invention will be understood from the following detailed description of the invention.

BRIEF DESCRIPTION OF THE DRAWINGS

FIG. 5 is a block diagram of a system including unidirectional and bi-directional cross-through paths.

FIG. 6a illustrates an implementation of a cross-through node which assumes the receive and transmit components are attached to opposite-direction runs.

FIG. 6b illustrates an implementation of a node which has two cross-through paths and two transmit-receive components.

FIG. 7 is a block diagram of a dynamically configured 2-port node.

FIGS. 8a and 8b are block diagrams of simple nodes which can be utilized in the simple ringlet of FIG. 4.

FIG. 9 is a block diagram of a configurable node of FIG. 7 implemented as in FIG. 8a.

FIG. 11 is a diagram of a configurable node of FIG. 7 implemented as in FIG. 6a.

FIG. 13 illustrates the routing of a sameNew code in a ringlet.

FIG. 14 illustrates the routing of a diffOld code in a ringlet.

FIG. 15 illustrates the routing of a sameOld code in a ringlet.

FIG. 16 illustrates the aging of a diffNew packet.

FIGS. 27a and 27b illustrates the scrubber aging of sameLoop and markPast codes respectively.

FIGS. 28a and 28b illustrates the stripping of an aged packet by the scrubber.

DETAILED DESCRIPTION OF THE INVENTION

Figure 1:
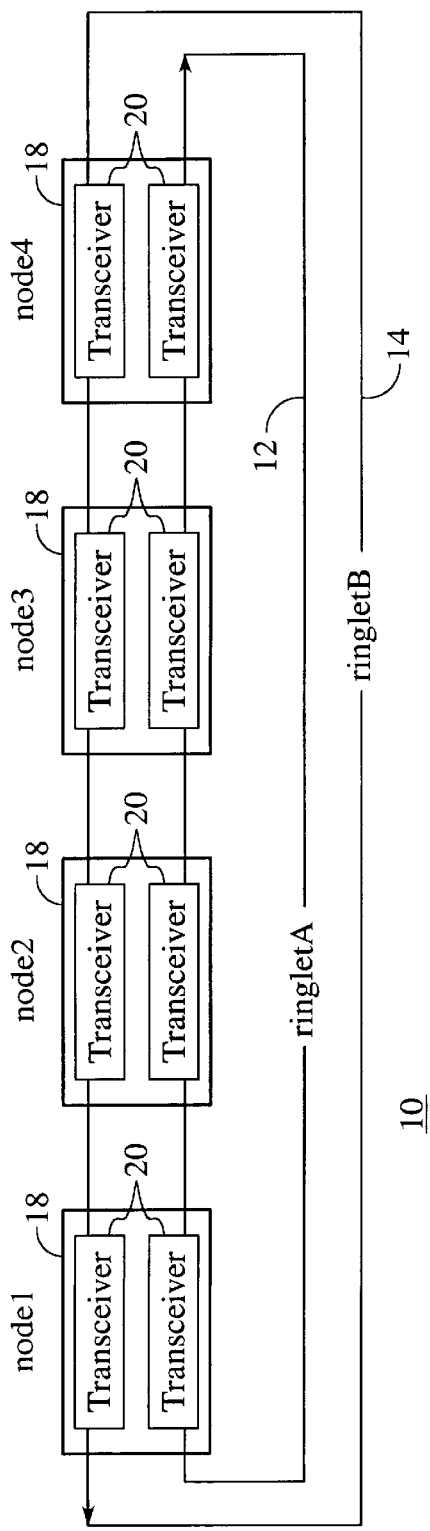
FIG. 1 is a block diagram of a conventional counter-rotating ringlet architecture.

The present invention relates to an improvement in the transmission of a packet in a serial interconnect or similar point-to-point architecture used to interconnect nodes. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Basic Nodes

In a simpler alternative to a topology of counter-rotating rings, a single ringlet architecture is presented. This ringlet architecture includes a plurality of nodes. Each node is connected another node by a pair of links, conveniently but not necessarily carried in a single cable. In general, each node is so connected to each of two neighbors to allow communication in either direction between each pair of nodes. One sequence of such connections forms a run moving, for example left-to-right between a series of nodes. The other sequence of connections forms a right-to-left run. Nodes may be producers or consumers as described above. Each node is capable of passing-by any packets that are not targeted for that node, that is each node can simply forward packets it is not supposed to remove. Multicast or broadcast packets and packets intended for other nodes are not removed.

Selected nodes are configured to provide two cross-over paths, each from one run to the other, so the two runs are linked to form a circle or ringlet. A node with a cross-over path is a terminal node. A ringlet may include two terminal nodes, each with a single cross-over path, or a single terminal node with two cross-over paths. If there are two terminal nodes, the physical topology may resemble a daisy chain but the bidirectional runs provide an electrical topology of a circle, or ringlet. If the physical topology is a circle as well, then any two nodes that can provide a cross-over path can be selected as terminal nodes, or a single node with two cross-over paths can be selected as the single terminal node, as described in more detail below.

Nodes in the ringlet that are not terminal nodes are intermediate nodes. The simplest intermediate node simply passes packets along each run, removing packets intended for that node or inserting new packets as needed for communication with other nodes.

One or more selected nodes may provide an optional connection between the two runs, thus allowing a fast path or short cut to the opposing run. A fast path may include a uni- or bidirectional cross through path in an intermediate node. In one preferred embodiment, a single node can provide both cross-over paths, but can also support a cross-between path for each run, allowing a packet either to continue on the same run without crossing over or, under the default routing, to cross over to the opposite run.

Within an intermediate node, a cross-by path is the primary path remaining on the same run and a cross-through path is an optional alternative path between runs. For a terminal node, the primary path is a cross-over. Within a node, a primary path is always available. The secondary path has a queue, for holding packets if the desired destination path is temporarily busy. The secondary-path is called "unavailable" if this path cannot be used because this queue has insufficient space. When the secondary path is unavailable, the packet remains on the primary path. Thus, although the secondary cross-between paths may be the fastest paths, they cannot always be utilized.

Route specifications

Figure 2:
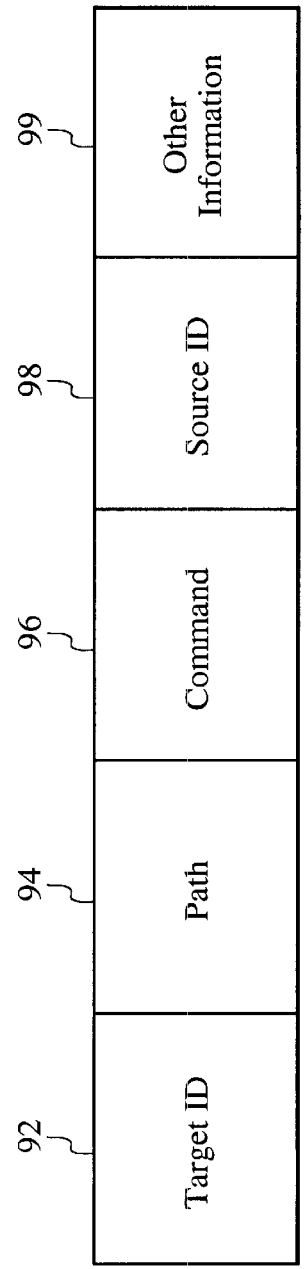
FIG. 2 is a block diagram of a data packet.

Referring now to FIG. 2, a typical data packet 90 comprises a plurality of fields. The packet 90 includes a target node identification (Target ID) 92, a path field 94, a command field 96 and source node identification (Source ID) 98. For some kinds of packets, additional information 99 (address, status, and/or data) is also provided). Send packets 90 circulate through the ringlet and are handled by a particular consumer node, based on a comparison of the packet's target ID value 92. A consumer node sends acknowledge packets back to the producer responsive to a send packet. The acknowledge packets would include the same fields as shown in packet 90. The difference being that the target ID for the acknowledge packet would be the same as the source ID of the send packet.

The Scrubber

In a preferred embodiment, a scrubber is located on a distinct node on the ringlet. The scrubber is responsible for performing a variety of ringlet-maintenance functions, as described in the following discussion.

Transmission errors can (in theory) modify a packet's address field so that the corrupted packet is unrecognizable by ringlet-local nodes. Also, requests are sometimes addressed to non-existent nodes. Nodes are responsible for updating the path field so that packets can be marked as aged and the aged packets can be removed by the node containing the active scrubber. On their next pass through the scrubber, these aged packets are acknowledged or removed from the ringlet.

For aged send packets (requests or responses), the scrubber has the behavior of a surrogate consumer. If the send packet has a valid CRC, an acknowledge packet (containing a LOST status code) is returned. The producer is responsible for the acknowledge-LOST processing. The producer is responsible for either setting an error detected bit or returning a packet to indicate an error was detected (to the node that created the request packet).

Producers that send a packet normally expect their acknowledge packet to be returned within a fixed number of ringlet circulation times. If the acknowledge is not returned, then an error is typically reported. Other packets (multicast, isochronous, and acknowledge packets) are processed differently; after they have been aged they are simply discarded when they pass through the scrubber.

Idle symbols are typically sent between normal data packets (request response or acknowledge). Idle symbols can be used to measure the ringlet circulation time as well as fill the space between packets. Inclusion of idle symbols can allow the elasticity components to detect and compensate for gradual changes in node-to-node delays between packet transmissions. These idle symbols can be inserted or deleted, to compensate for small differences in the node's clock frequencies. In a preferred embodiment, on the ringlet, packet creation involves causes idle symbols to be deleted; packet removal causes idle symbols to be created.

Initial Configuration

A circuit for a scrubber preferably is available within all of the nodes in a ringlet. Activation of a particular node's scrubber may be according to a protocol such as a voting protocol during a bus reset.

Selection of the terminal nodes is based on the location of an unconnected cable. In a system where multiple nodes are capable of acting as a terminal node, if the physical connections allow, the specific terminal nodes can be selected at a specified time. The node where the scrubber is located is selected during a ringlet-reset, based on a variety of factors related to a particular node's operation. In a preferred embodiment, the terminal node or nodes are selected during a bus reset. Selection of the terminal node depends in part on the selection of a scrubber. It is preferable to have the scrubber approximately half way between the cross-over paths.

SPECIFIC EXAMPLES

Simple loop

Figure 3:
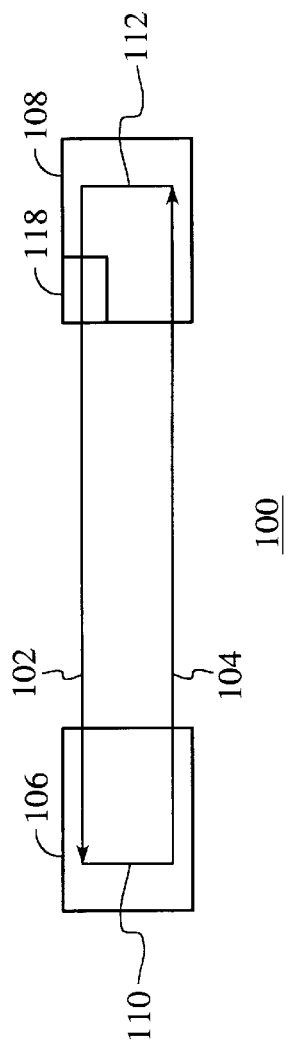
FIG. 3 illustrates a first embodiment of a single ringlet architecture.

Referring to FIG. 3, in its simplest form, a ringlet 100 includes first and second runs 102 and 104 and two nodes 106 and 108. In this embodiment, the nodes 106 and 108 are both terminal nodes. Each of the terminal nodes 106 and 108 includes cross-over paths 110 and 112, respectively, which are the primary, in fact only, paths between runs 102 and 104 within each of the nodes 106 and 108. Each node 106, 108 may have the circuitry to provide a scrubber, but in a single ringlet architecture typically only one of the scrubbers (in this case the scrubber 118 in node 108) is active. Operation of the scrubber is described in more detail below.

Although this single ringlet architecture has some advantages over the counter rotating ringlet architecture 10 (lower cost and less complex), it does not provide a faster path for processing data packets therebetween. Accordingly, there is described hereinbelow, in two additional preferred embodiments, a single ringlet architecture that provides for optional fast paths.

Simple loop with intermediates

Figure 4:
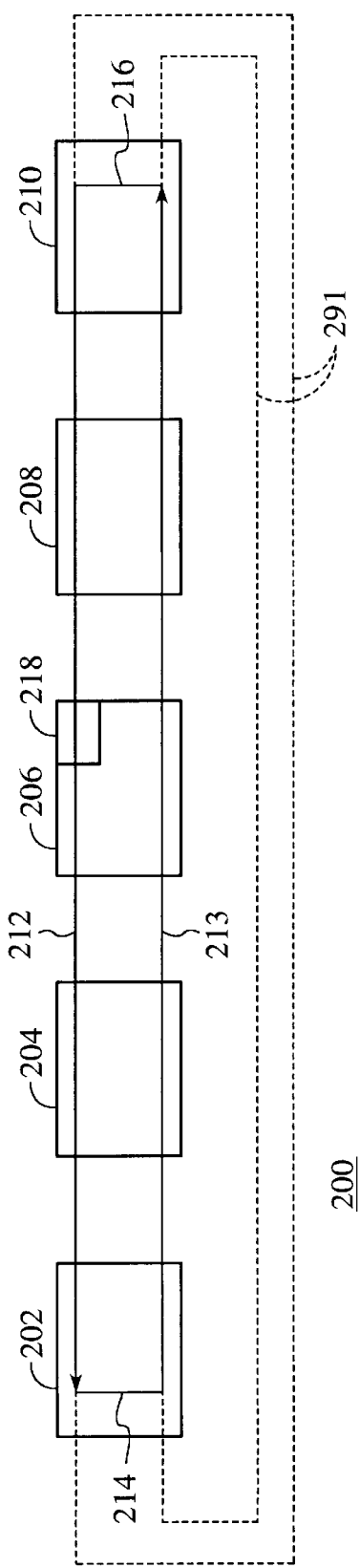
FIG. 4 illustrates a second embodiment of a single ringlet architecture.

FIG. 4 illustrates a second embodiment of a single ringlet architecture 200. The dotted lines 291 illustrate a cable that is physically or logically disconnected. In this ringlet architecture 200, there are two types of nodes: intermediate nodes and terminal nodes. The ringlet architecture 200 includes two terminal nodes 202 and 210 and three intermediate nodes 204, 206 and 208. Fewer or more intermediate nodes could also be used. The point-to-point interconnects provide bus-like services by connecting multiple nodes with links to provide the runs 212 and 213, respectively. In this single ringlet architecture 200, the terminal nodes 202 and 210 include cross-over paths 214 and 216, respectively, which in this embodiment are, respectively, the down and up paths between runs.

In both ringlet structures 100 and 200, the nodes (of FIG. 3 and FIG. 4, respectively) can be internally hardwired to cross-by, transmit and receive data packets in a predetermined fashion or in a preferred embodiment the nodes could be configurable, allowing transmit and receive components to be attached to either run.

Optional cross-through paths

Referring now to FIG. 5, what is shown is the single ringlet architecture 200' which includes alternate paths. In this embodiment, the elements shown in FIG. 5 that are common with those of FIG. 4, including a similar designation. A simple fast-path routing technique is to provide unidirectional cross-through paths 201 and 203 as in intermediate nodes 204' and 208' and bi-directional cross-through path 205 in intermediate node 206. Within an intermediate node, a cross-by path is the primary path remaining on the same run and a cross-through path is an optional alternative path between runs. The secondary path has a queue, for holding packets if the path destination path is temporarily busy. The secondary-path is called "unavailable" if this path cannot be used because this queue has insufficient space. The optional paths require buffers being available so that the packet can be queued, if the opposite run is occupied (a path is passing through).

If the buffer is filled, the path can not be taken and the packet will continue on the primary path. When the secondary path is unavailable, the packet remains on the primary path. Thus, although the secondary cross-through and cross-between paths may be the fastest paths, they cannot always be utilized. The optional paths require buffers being available so that the packet can be queued if the path is busy on the opposite side.

If the buffer is filled, the path can not be taken and the packet will continue on. On the intermediate node 204', the unidirectional cross-through path 201 (when available) allows packets to be transferred from run 212' to run 213'. On intermediate node 208', the unidirectional cross-through paths 203 (when available) allows packets to be transferred from run 213 to run 212. On the intermediate node 206', the bidirectional cross-through path 205 (when available) allows packet to be transferred (in either direction) between runs 212 and 213.

FIG. 6a shows a node 208' for simple implementation of a cross-through path in which the receive 252 and transmit 250 components are attached to opposite-direction runs 213' and 212' respectively, and coupled to the fast path. This node can be implemented as configurable node 220 as described in detail with respect to FIG. 7 and FIG. 11. This alternate fast-path route 203 would not be taken, and the packet would pass through the receive component 252, if none of the transmit buffers were free. This simple form of fast-path routing is compatible with node designs that allow their transmit/receive components to attach to either run.

FIG. 6b is a diagram of a higher performance node 206' (of FIG. 5) which has two cross-through paths 205' and 205" in addition to having transmit-receive components 250 and 252 on each run. This node could be implemented through a modification of the configurable node 220 which includes additional multiplexers as well as another set of transmit and receive components.

As mentioned before, cross-through paths can only be used if the path is available, i.e., the packet is known to fit within the currently-available transmit-buffer space. If the cross-through path is unavailable, the packet continues on its default cross-by direction, remaining in the run while passing through the node.

It is important when providing these alternate paths that there be a system for efficiently utilizing these paths. A data packet includes within it the path information which allows for efficient routing as the packet passes through nodes. To more particularly describe this feature in the context of the single ringlet architecture of the previous figures, refer now to the following discussion.

Node Configuration

To further describe the details of a node which is configurable, refer now to FIG. 7, which is a block diagram of node 220 and which could be configured as any of nodes 202, 204, 206, 208, or 210. The configurable node 220 includes elasticity buffers 222 and 224 which are coupled to first run and second runs 212 and 213, respectively. The elasticity buffers 222 and 224 allow for limited buffering in the event there is a slight variation in frequencies of oscillators (not shown) associated with each of the nodes. In one preferred embodiment, the capacity of elasticity buffers will hold a few symbols, where these symbols are either idle symbols or a portion of a data packet. The multiplexers 225, 226, 228 and 230 provide for the transmission of data packets in an appropriate manner to allow for configuration of the node in a plurality (which will be explained in detail later). The node 220 includes two interface components: the receive component 252 (which removes packets) and the transmit component 250 (which inserts packets). To simplify this illustration, the other node-interface components (receive and transmit queues) as well as the device interface are not shown.

Connecting two-ported nodes with 2-link cables allows the system to provide autoconfiguration and dynamic reconfiguration capabilities. Autoconfiguration is typically as simple as sensing the end of a cable run, or determining how to connect the receive component and transmit components of the node. The configurable node 220, which is shown in FIG. 5a, electronically switches between attachment paths.

In a dynamically-reconfigurable node, the receive component 252 and transmit component 250 can be attached to either (left-going or right-going) runs of a ringlet. Node 220 would include a mode bit contained in register 262 that specify which runs should be connected to the transmit component 250 and the receive component 252. While the ringlet is operational, these mode bits can be overwritten by software. To avoid corruption of currently-active packets, the effect of these new mode-bit values is delayed until the next bus reset signal, i.e., when the locations of these components can be safely changed without affecting currently active data-packet transfers.

In a typical embodiment, one of the mode bits would be utilized to indicate the mode of the receive component 252 and one mode bit would be utilized to indicate the mode of the transmit component 250 via a register 262. Essentially, therefore, these bits would provide for the various combinations of receive component and transmit component on the run's path. The mode bits would also be used to allow terminal nodes to either allow attachment to a port or allow attachment to an internal cross-over point The scrubber 218 would typically be within the receive component as shown, to allow for the aging of packets. As before mentioned, the node 220 includes a scrubber 218 in its receive component 252 for aging packets as the packets pass through it. To more particularly describe the responsibilities of the scrubber within the node, refer now to the following.

Simple (No Optional Path) Node

Nodes with cross-through or cross-between path illustrated in FIGS. 6a and 6b are not much more complex than nodes without these optional paths. As examples of such nodes, consider FIGS. 8a and 8b described in detail below.

FIGS. 8a and 8b are block diagrams of simple nodes 304 and 308, respectively, which can be implemented by node 220 of FIG. 7. Simple nodes 304 and 308 typically include transmit and receive components 250 and 252. As shown in FIG. 8a, the transmit 250 and receive 252 components may be located on the same pass-through run, or as is shown in FIG. 8b, the transmit 250 and receive 252 components may be attached to opposing-direction runs.

Figure 9:
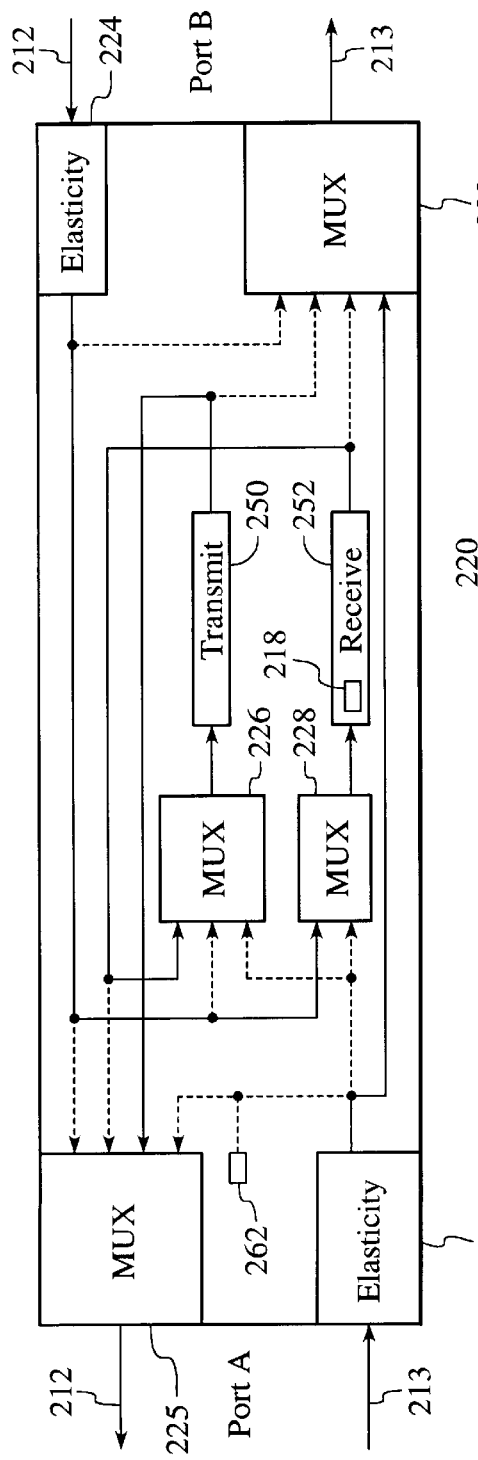

FIG. 9 illustrates the data paths that are used when node 220 are configured to appear on the same run, as previously illustrated in FIG. 8a. The active and inactive data paths are illustrated by solid and dotted lines respectively to indicate the routing of data packets within the node.

Figure 10:
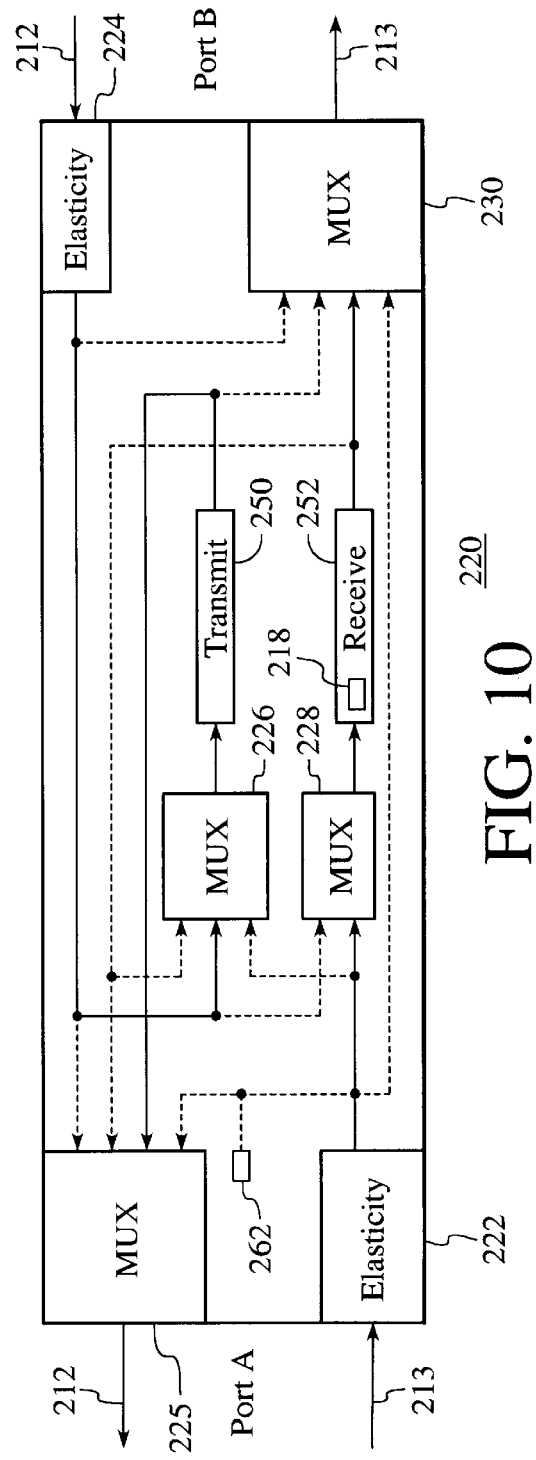
FIG. 10 is a block diagram of a configurable node of FIG. 7 implemented as in FIG. 8b.
Figure 11:
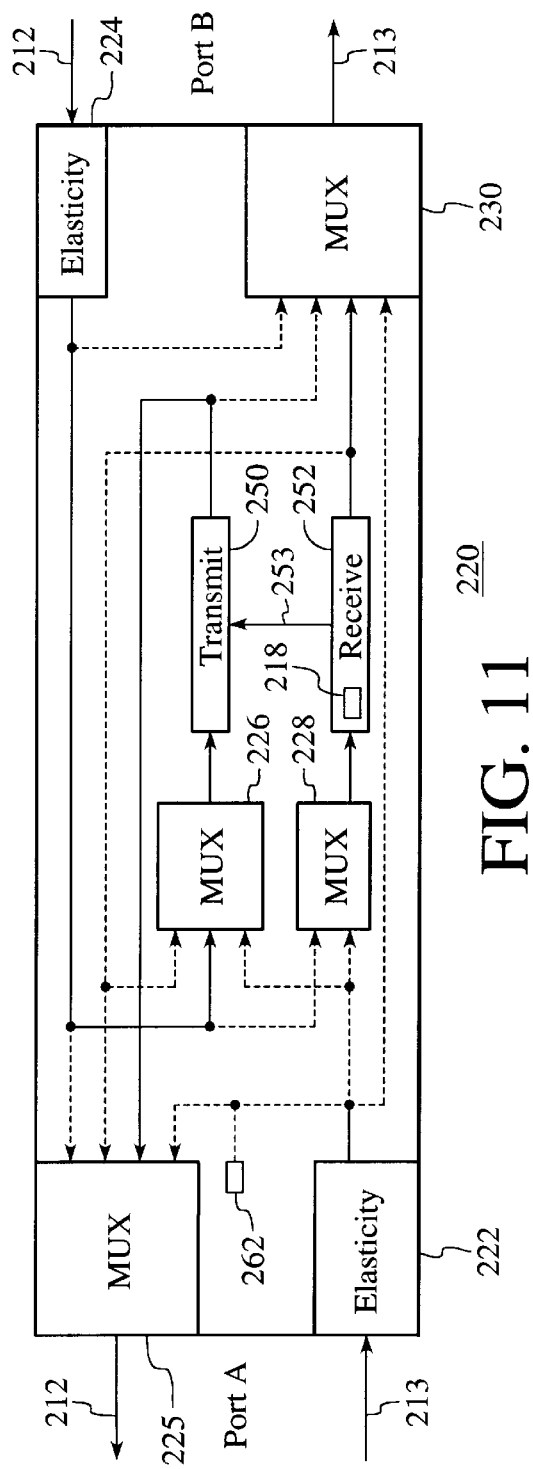

As another example, FIG. 10 illustrates the data paths (by solid and dotted lines) that are used when the nodes 220 are configured to appear on the opposite runs, as shown in FIG. 8b. As a final example, FIG. 11 illustrates the data paths within the node that are used when node 220 is configured to appear on opposite runs and a fast path 253 is supported. Thus, the secondary fast path (253 in FIG. 4) adds minimal complexity since the other components within the node are still required.

Packet's path-field values

A critical feature of the present invention is provide optional data paths for the faster transmission of data packets within the ringlet. The following discussion describes the various optional paths and their features.

To efficiently utilize the cross-through paths, nodes in this embodiment, set a (ringlet-local) 2-bit path field within their packet headers, to one of the diffNew or sameNew values specified in Table 1. Two other values referred to as diffOld and sameOld are created as these packets are routed to their target ID destination. The subname "diff" refers to a bit with the path field that indicates the packet should be sent on an opposing run. The subname "same" refers to a bit within the path field that indicates this packet should be sent on the same run. The subname "New" indicates that a packet which has not been aged. The subname "Old" indicates a packet that has been aged. The path field changes as the packets pass through the scrubber (the functions of which will be described in detail later in the specification), intermediate cross-through paths, and end-of-run cross-over paths, as will be described. To ensure a finite-packet lifetime, the age-field changes are monotonically increasing; the higher-valued diffOld and sameOld packets are ultimately stripped by the scrubber.

TABLE 1

| Value | Name | Description |
| --- | --- | --- |
| 0 | diffNew | Cross-through to opposite run; hasn't passed by the scrubber |
| 1 | diffOld | Cross-through to opposite run; has passed by the scrubber |
| 2 | sameNew | Remain on the same run; hasn't passed by the scrubber or has crossed-through since passing by the scrubber |
| 3 | sameOld | Remain on the same run; has passed by the scrubber |

The diffNew label indicates that the packet should cross-through to the opposing run. When using a cross-through path, labels are changed from diffNew-to-sameNew, so that cross-through paths are only taken once. When passing by the scrubber, labels are changed from diffNew-to-diffOld, so that these packets can be discarded on their next pass by the scrubber.

The diffOld label indicates that the packet should cross-through to the opposing run. When using a cross-through path, labels are changed from diffOld-to-sameNew, to enforce the desired opposing-run behavior. Send and acknowledge packets that are marked diffOld are stripped when they pass by the scrubber. Stripping of send packets involves replacing the send packet with a smaller acknowledge packet and idle symbols. Stripping of acknowledge packets involves replacing the acknowledge packet with idle symbols.

The sameNew label indicates that the packet can remain on the current run until the cross-over path (at the end of the run) is reached. When passing-by the scrubber, labels are changed from sameNew-to-sameOld, so that these packets can be stripped on their next pass by the scrubber.

The sameOld label indicates that the packet can remain on the current run until the scrubber or the cross-over path (at the end of the run) is reached. When sameOld packets pass-by the scrubber, stripping of send packets involves replacing the send packet with a smaller acknowledge packet and idle symbols. Stripping of acknowledge packets involves replacing the echo packet with idle symbols.

A. diffNew routing

Figure 12:
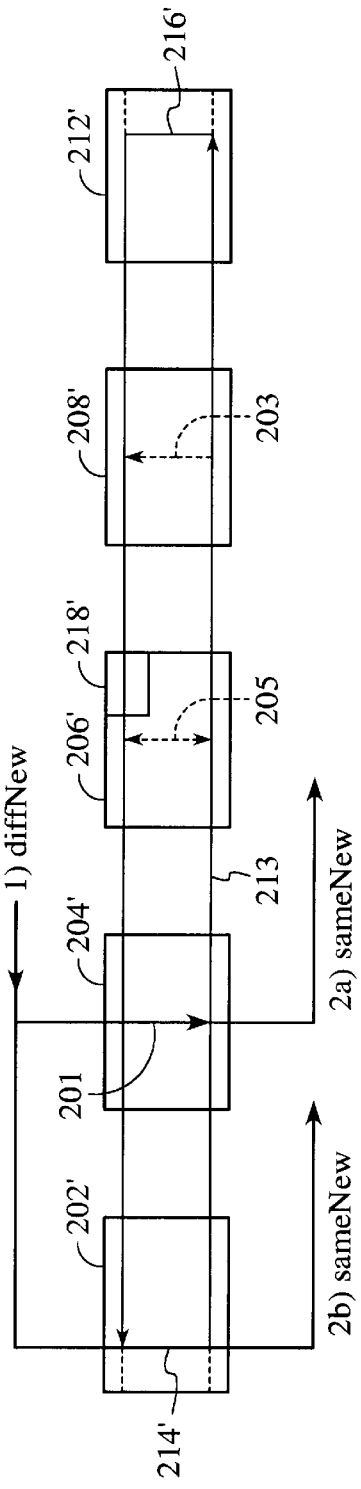
FIG. 12 illustrates the routing of a diffNew code in a ringlet.

FIG. 12 shows the routing of diffNew code in a ringlet. The diffNew code indicates an attempt to use a cross-through path if available, or if not available, the next available cross-over path is used. The packet inherits same-New label after a cross-through or cross-over are used.

B. sameNew routing

FIG. 13 shows the routing of a sameNew code in a ringlet. The sameNew code indicates an attempt to remain on the current run. A sameNew-labeled packet can remain on the current run until the cross-over path 217 is reached. The packet's sameNew label isn't changed when the cross-over 217 path is taken.

C. diffOld routing

FIG. 14 shows the routing of a diffOld code in a ringlet. The diffOld code indicates an attempt to use a cross-through path if available. The packet label changes from diffOld-tosameNew when a cross-through path is taken. The diffOld label is changed to sameNew (rather than sameOld) so that the packet has the opportunity to pass-by all nodes, on both runs, before being stripped. The packet label changes from diffOld-to-sameOld when a cross-over path is taken.

D. sameOld routing

FIG. 15 shows the routing of a sameOld code in a ringlet. The sameOld code indicates an attempt to remain on the current run. A sameOld-labeled packet can remain on the current run until the cross-over path is reached. The packet's sameOld label isn't changed when the cross-over path is taken.

E. diffNew aging

FIG. 16 shows the aging of a diffNew packet. The scrubber ages packets by changing labels from diffNew-to-diffOld. This distinct diffOld label facilitates stripping of these packets on their second pass through the scrubber.

F. sameNew aging

Figure 17:
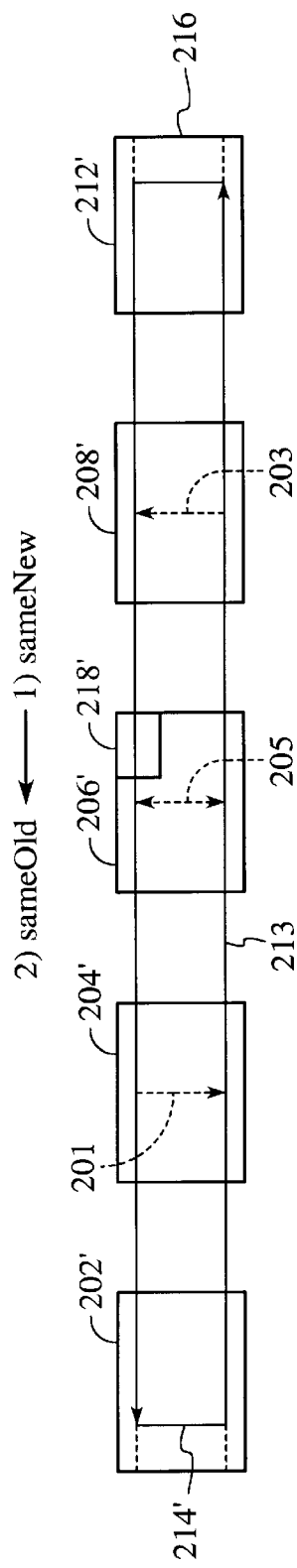
FIG. 17 illustrates the aging of a sameNew packet.

FIG. 17 shows the aging of a sameNew packet. The scrubber ages packets by changing labels from sameNew-to-sameOld. This distinct sameOld label facilitates stripping of these packets on their second pass through the scrubber.

G. Send-packet stripping

Figure 18:
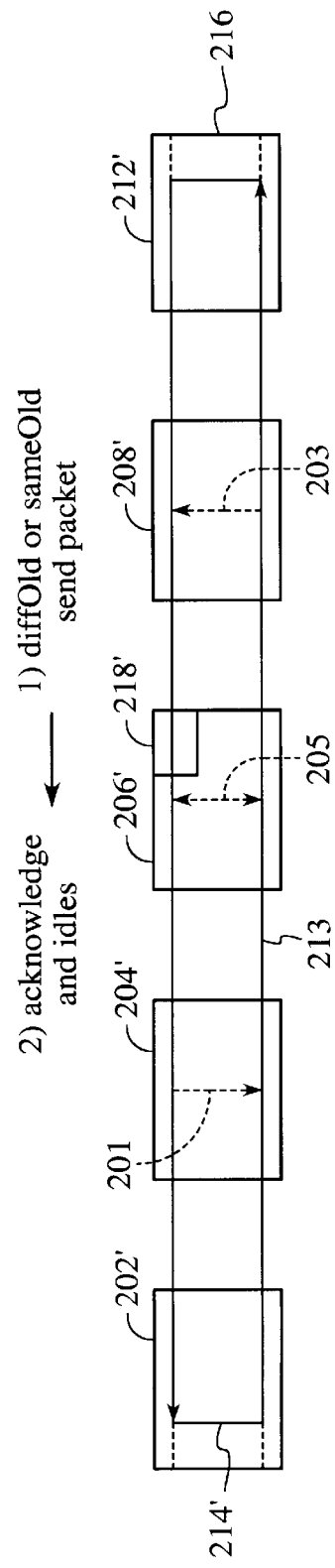
FIG. 18 illustrates the scrubbing diffOld and sameOld send packets.

FIG. 18 shows the stripping of diffOld and sameOld send packets, which is done by the scrubber. Stripping involves replacing each previously aged send packet with a smaller acknowledge packet and idle symbols.

H. diffOld and sameOld acknowledge packet stripping

Figure 19:
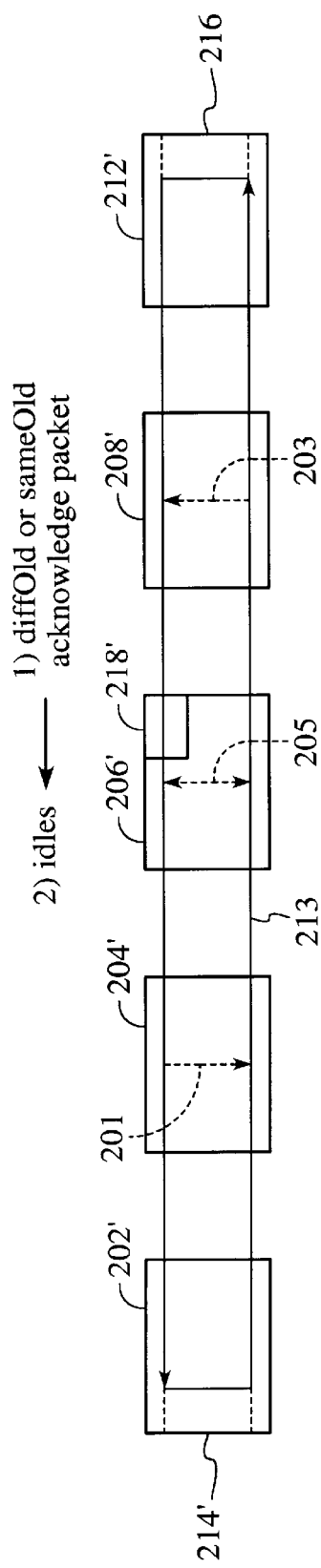
FIG. 19 illustrates the scrubbing of diffOld and sameOld acknowledge packets.

FIG. 19 shows the stripping of diffOld and sameOld acknowledge packets. The scrubber also strips diffOld-labelled and sameOld-labelled acknowledge packets. Stripping involves replacing each previously aged acknowledge packet with idle symbols.

Cross-Between Capable Ringlet Architecture

A third embodiment of a ringlet architecture can further improve performance by supporting cross-between paths (at the end of a run) as well as cross-through paths at intermediate nodes. What is meant by cross-between path is a path at the end of the run which can jump over to the same run. This third embodiment will be described in detail hereinbelow.

Figure 20:
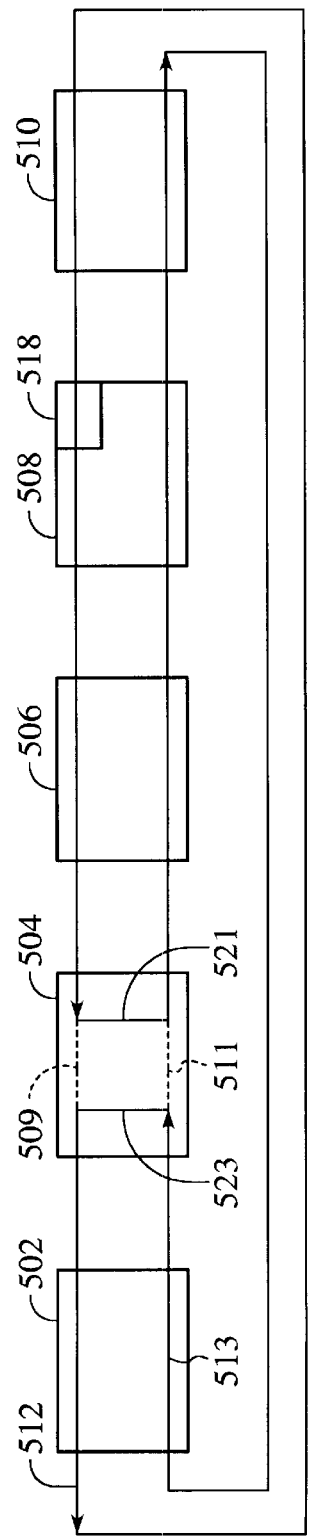
FIG. 20 illustrates a third embodiment of a self-closed ringlet.

FIG. 20 illustrates this third embodiment of a cross-between capable ringlet architecture 500. The cross-between capable ringlet architecture includes all of the advantages above-described with respect to ringlet architecture 200 but also includes other functionality that provides increased performance thereover. Ringlet 500 includes intermediate nodes 502, 506 and 508 and one terminal node 504.

Node Configuration

The features described in FIG. 4 regarding the node 220 are sufficient to support the features of a unidirectional cross-between capable ringlet architecture. To form the basic ringlet 500 of FIG. 20, one of the nodes in this case, node 504, is selected to provide both of the cross-between paths 501 and 511 as well as cross-over paths 521 and 523. Selection of this node 502 would typically be based on its distance from the scrubber.

To more clearly understand the features and advantages of this ringlet architecture, some basic characteristics will be reiterated hereinbelow. Firstly, as before mentioned, it should be understood that a ringlet includes a plurality of nodes. The nodes are of two different types, either an intermediate node or a terminal node. Terminal nodes have cross-over and/or cross-between paths. The intermediate nodes have cross-by and/or cross-through paths. As before mentioned in context of the present application, a cross-over path is an up or down crossing between a terminal node (a node at the end of a run), a cross-between path is a crossing between ends of the same run in a terminal node, a cross-through path is a crossing between runs in an intermediate node (a node that is not at the end of a run), and cross-by path is a path on the same run through an intermediate node.

Node attachment structures

1. Optional cross-through paths

Figure 21:
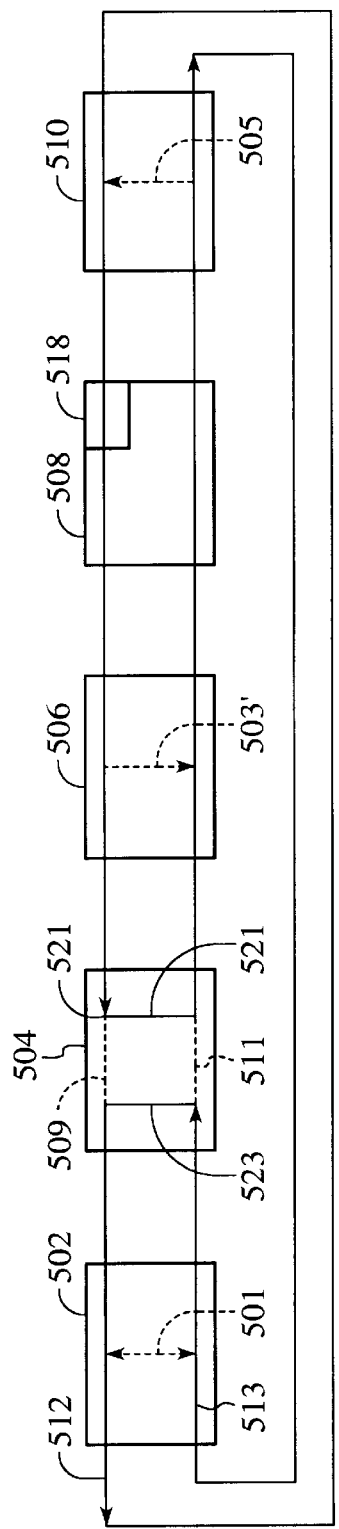
FIG. 21 is a block diagram of an embodiment of fast path routing technique including optional cross-through paths.

FIG. 21 is a block diagram of one embodiment of a fast path ringlet architecture 500', including a bidirectional cross-through path 501 in node 502 and unidirectional cross-through paths 503 and 505 in nodes 506 and 510, respectively. On the intermediate nodes 502, 506 and 510, cross-through paths 501 and 503 and 505 can allow a packet to be transferred between run 512 and run 513 of the ringlet. At the ringlet ends 521 and 523, cross-over paths provide a default connection between runs 512 and 513. If node 504 supports cross-between paths, cross-between paths 509 and 511 can allow packets to remain on the same run 512 or 513 and jump or move from, for example, one end of run 512 to the other end of run 512, without needing to cross between runs 512 and 513 and return, in this example, on run 513.

2. Pass-through node

Referring back to FIGS. 5a and 5b, simple nodes have similar functionality as described with respect to ringlet architecture 200.

3. Cross-through nodes

Referring back to FIGS. 9a and 9b, cross-through nodes have a similar functionality as described with respect to ringlet architecture 200.

Route specifications

This ringlet structure would utilize a packet similar to that described in FIG. 11. The packet would typically contain more bits in path field to provide than that described with reference to ringlet architecture 200 to provide for the additional optional paths as will be described in detail hereafter.

A. Packet's path-field values

To efficiently utilize the cross-through and cross-between paths in a preferred embodiment, producing nodes are expected to set a (ringlet-local) 3-bit path field within their packet headers to one of the diffJump, diffLoop, sameJump or sameJump values specified in Table 2. Four other values referred to as sameLast, markThru, markPast, and markLast are created as these packets are routed to their target ID destination. The "diff" and "same" subnames have the same meanings as before described with respect to Table 1. The "Jump" subname refers to a packet using a cross-between path. The "Loop" subname refers to a packet using a cross-over path. The "Mark" subname refers to a packet that has passed by a target node. The "Past" subname refers to a packet that cannot use a cross-between or cross-through path. The "Last" subname refers to an aged form of the packet. The path field changes as the packets pass through intermediate node cross-through or terminal-node cross-over/cross-between paths, as described in the following subclauses. To ensure a finite-packet lifetime, the path-field changes are monotonically increasing; the higher sameLast and markLast packets are removed by the scrubber.

TABLE 2

Routing path codes

| Value | Name | Description |
|---|---|---|
| 0 | diffJump | Cross-through to opposite run, then cross-between |
| 1 | diffLoop | Cross-through to opposite run, then cross-over |
| 2 | sameJump | Ignore cross-through paths, then cross-between |
| 3 | sameLoop | Ignore cross-through paths, then cross-over |
| 4 | sameLast | A scrubber-aged version of sameLoop |
| 5 | markThru | Passed-by target, uses cross-through path |
| 6 | markPast | Crossed-through to target, restricted to cross-over paths |
| 7 | markLast | A scrubber-aged version of markPast |

Packets may be generated with a diffJump label, to indicate that the packet should be routed-to and then remain-on the opposing run. When passing through intermediate nodes, the first available cross-through path is taken; if taken, the label changes from diffJump to sameJump. If the terminal node is reached, the cross-over path is taken and the label changes from diffJump to sameJump. The diffJump to sameJump label changes are necessary to enforce the desired opposing-run behavior. The diffJump packets are not aged by the scrubber, since they have a finite lifetime before being changed from diffJump to sameJump when routed through cross-through or cross-over paths.

Packets may be generated with a diffLoop label to indicate that the packet should be routed to the opposing run and thereafter use only the primary paths. When passing through intermediate nodes, the first available cross-through path is taken; if taken, the label changes from diffLoop to sameLoop. If the terminal node is reached, the cross-over path is taken and the label changes from diffLoop to sameLoop. The diffLoop to sameLoop changes are to enforce the desired opposing-run behavior. The diffLoop packets are not aged by the scrubber, since they have a finite lifetime before being converted to sameLoop when routed through cross-through or cross-over paths.

Packets may be generated with a sameJump label, to indicate that the packet should remain on its present run. When passing through intermediate nodes, cross-through paths are never taken. If the terminal node is reached, an available cross-between path is taken; if unavailable, the cross-over path is taken; in both cases, the label changes from sameJump to sameLoop. The sameJump packets are not aged by the scrubber, since they have a finite lifetime before being converted to sameLoop when routed through the next cross-between or cross-over paths.

Packets may be generated with a sameLoop label, to indicate that only primary paths should be taken. When passing through intermediate nodes, cross-through paths are never taken. If the terminal node is reached, the cross-over path is taken and the label remains unchanged. To limit sameLoop packet lifetimes, these packets have their labels changed from sameLoop to sameLast when they pass through the scrubber.

The sameLast label is an aged version of sameLoop that has similar fast-path routing characteristics. To limit sameLast packet lifetimes, each sameLast packet is stripped when it next passes through the scrubber.

The markThru label indicates that a previously labeled diffJump, diffLoop, sameJump, sameLoop, or sameLast packet has passed by a target node that could recognize the packet but could not remove it, because its receiver hardware is located on the opposing run. When passing through intermediate nodes, available cross-through paths are taken and the label changes to markPast. If the terminal node is reached, the cross-over path is taken and the label is also changed to markPast. The markThru packets are not aged by the scrubber, since they have a finite lifetime before being converted from markThru to markPast when routed over the next cross-through or cross-over path.

The markPast label indicates that a (previously markThru) packet has moved between runs at a cross-through or cross-over path. When passing through intermediate nodes, the secondary cross-through path is never used. If the terminal node is reached, the primary cross-over path is used and the label changes from markPast to markLast. To limit markPast packet lifetimes, these packets have their labels changed from markPast to markLast when they pass through the scrubber.

The markLast label is an aged version of markPast. When passing through intermediate nodes, the secondary cross-through path is never used. If the terminal node is reached, the primary cross-over path is used and the markLast label is unchanged. To limit markLast packet lifetimes, each of these packets is stripped when it passes through the scrubber.

B. Routing using diffJump

Figure 22:
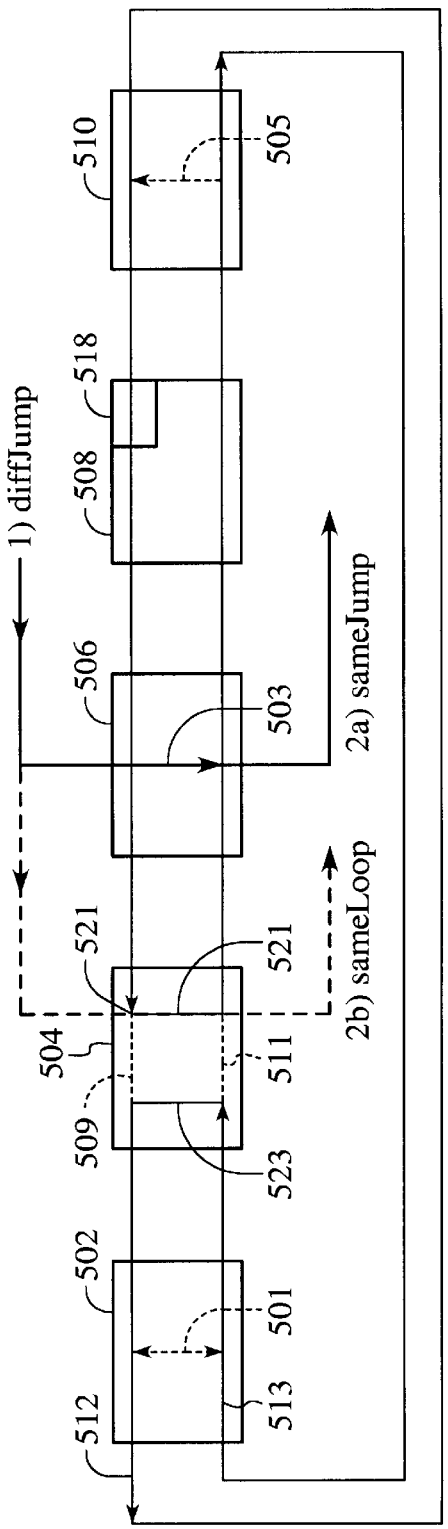
FIG. 22 illustrates the routing of the diffJump code in a ringlet.

Referring now to FIG. 22, the diffJump code (1) indicates an attempt to use either cross-through 503 or, if not available, a cross-over path 521 is used. The packet inherits the sameJump (2a) or sameLoop (2b) label, after cross-through 503 and cross-over path 521 are used, respectively.

C. Routing using diffLoop

Figure 23:
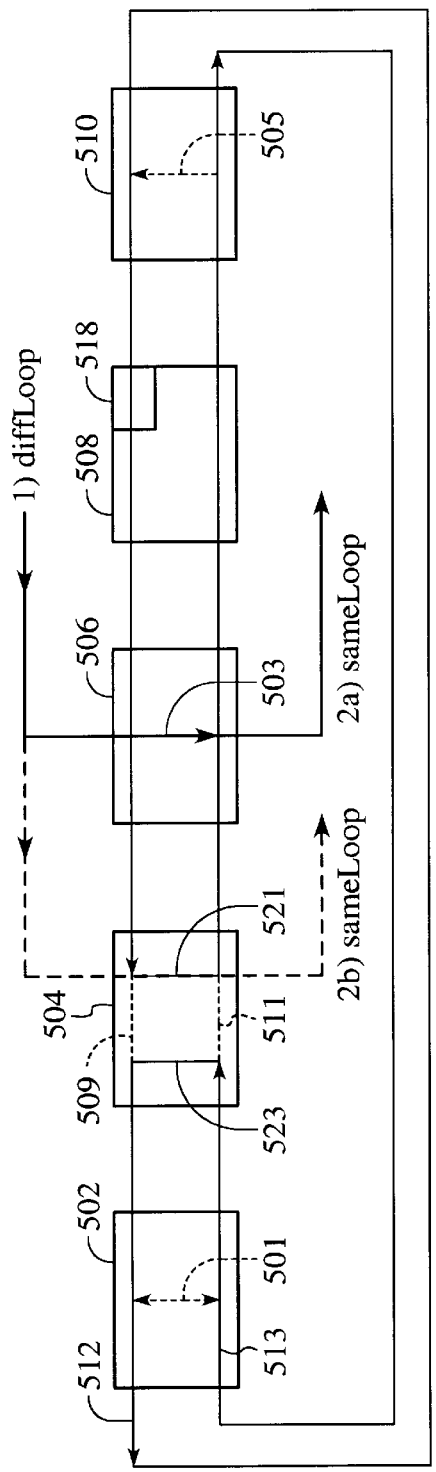
FIG. 23 illustrates the routing of a diffLoop code in a ringlet.

Referring now to FIG. 23, the diffLoop code (1) indicates an attempt to use either cross-through 503, or if not available, a cross-over path 521 is used. The packet inherits a sameLoop label (2a and 2b) after a cross-through path 503 or cross-over path 517 is used.

D. Routing using sameJump

Figure 24:
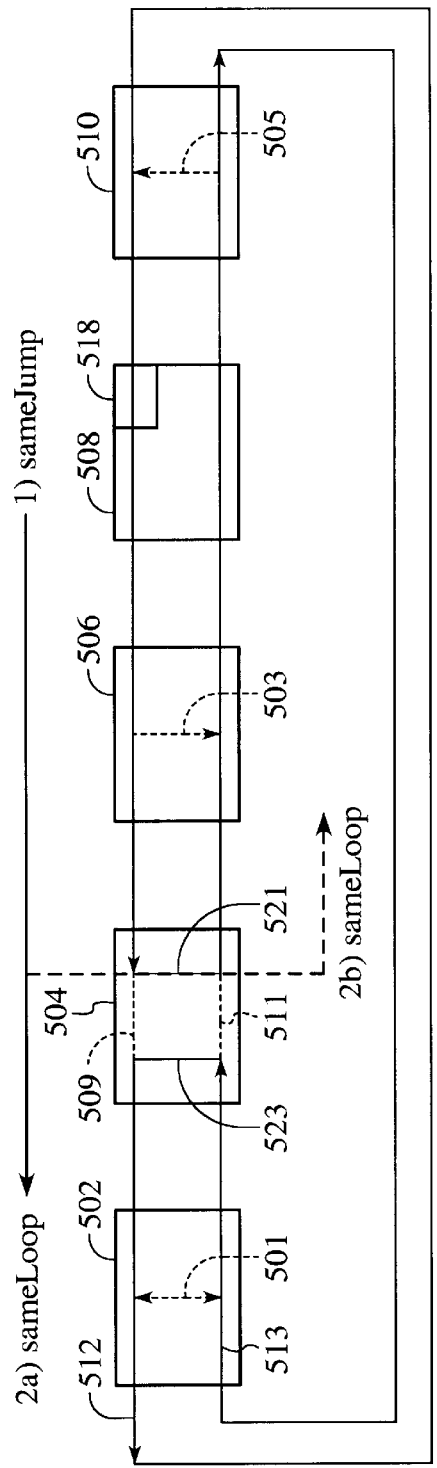
FIG. 24 illustrates the routing of a sameJump code in a ringlet.

Referring now to FIG. 24, the sameJump code (1) indicates an attempt to use a cross-between path 509. When the end-of-the-run is reached, the cross-between path 509 (rather than the cross-over path 521) should be used. The cross-over path 521 is used if the cross-between path 509 is unavailable. The packet inherits a sameLoop label (2a and 2b) when a cross-between path 509 or cross-over path 521 is used.

E. Routing using sameLoop

Figure 25:
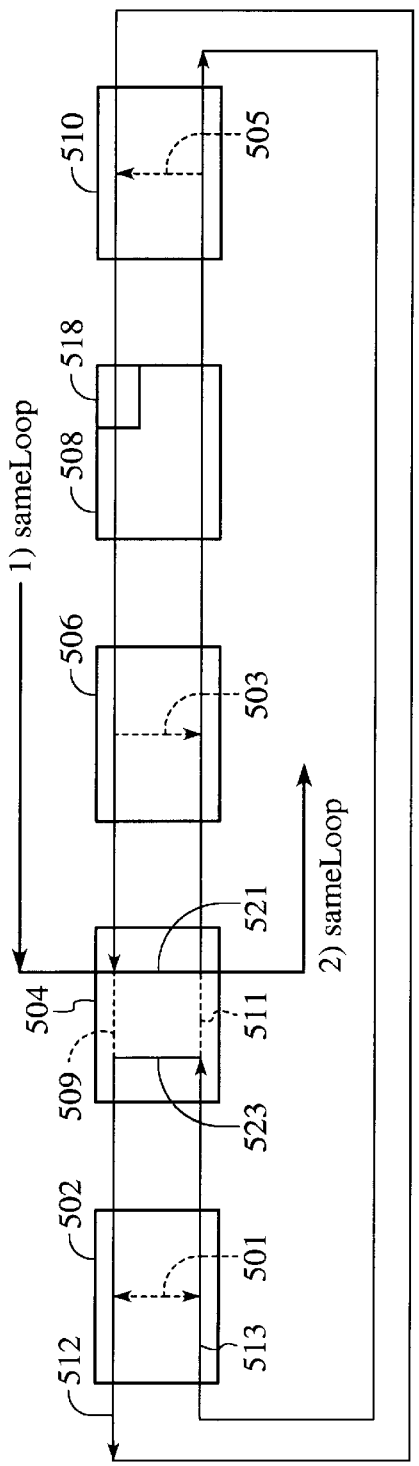
FIG. 25 illustrates the routing of sameLoop code through a ringlet.

Referring now to FIG. 25, the sameLoop code (1) indicates a desire to use a cross-over path 521 (rather than cross-between path 509). The cross-over path 521 is used when the end-of-the-run is reached. The packet retains its sameLoop label when the cross-over path 521 is used.

F. Cross-address matching

Figure 26:
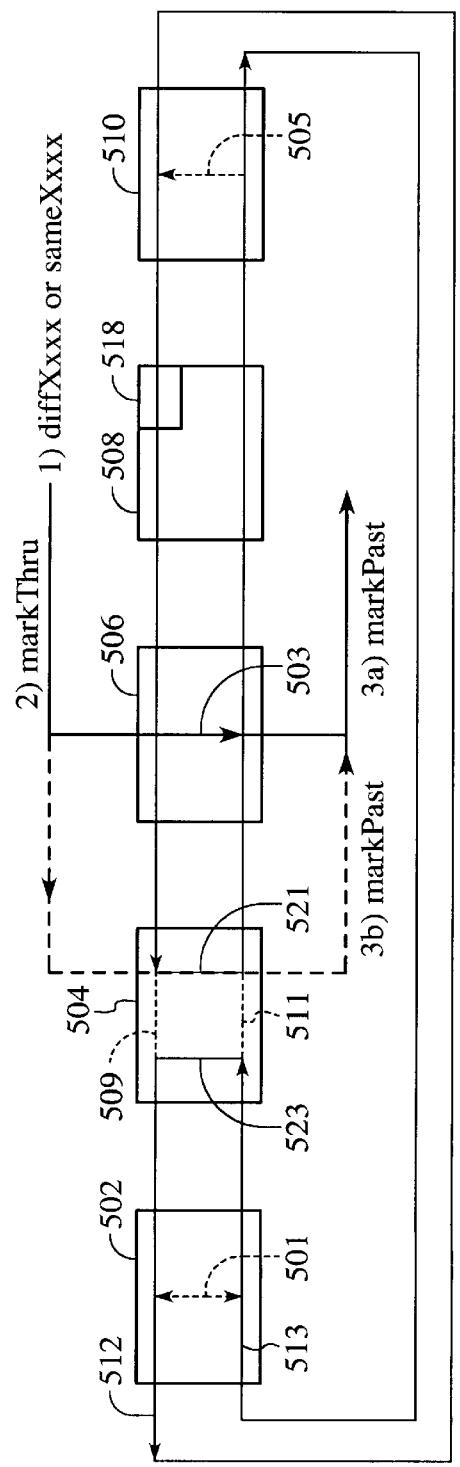
FIG. 26 illustrates the routing of a cross address code through a ringlet.

Referring now to FIG. 26, a consumer node may have the capability of detecting and labeling its packets, even though its receive component is located on the opposing run. When this occurs, diffJump, diffLoop, sameJump, sameLoop and sameLast packets are updated with a markThru label. A markThru packet (2) should take the next available cross-through 503 or cross-over path 517, where (for aging purposes) its label changes from markThru-to-markPast 3a and 3b.

15

G. Scrubber responsibilities

In addition to the scrubber responsibilities described in the first embodiment the scrubber has additional responsibilities in this second embodiment will be described hereinbelow.

G1. Scrubber aging

Referring now to FIGS. 27a and 27b, the scrubber 518 of node 508 is responsible for aging packets and stripping aged packets within a few ringlet-circulation times. The scrubber ages packets by converting labels from sameLoop (1) to sameLast (2) as shown in FIG. 27a and from markPast (1) to markLast (2) as shown in FIG. 27b. The diffJump, diffLoop and sameJump packets are not changed by the scrubber 218, since these packets are eventually aged-to-sameLoop after passing through (one or several) cross-through, cross-over, or cross-between paths. The markThru packet is not changed by the scrubber 518, since this packet changes from markThru to markPast at cross-through and cross-over paths.

G2. Stripping aged packets

Referring now to FIGS. 28a and 28b, the scrubber 518 is also responsible for stripping previously-aged sameLast and markLast packets. Stripping of aged send packets involves replacing the send packets with a smaller acknowledge packet and idle symbols. Stripping acknowledge packets involves replacing the acknowledge packet with idle symbols.

CONCLUSION

Through the use of a single ringlet in conjunction with fast path routing techniques, data packets can be more efficiently routed in a interconnect-like environment. By providing cross-between paths in the cross-over nodes and cross-through paths in intermediate nodes in the ringlet architecture and then strategically routing over the cross-between and cross-through paths, the overall speed of the architecture is improved. In addition, through a provision of a scrubber in a node, packets can be appropriately aged and removed from the architecture.

Although the present invention has been described in accordance with the embodiments shown in the figures, one of ordinary skill in the art recognizes there could be variations to the embodiments and those variations would be within the spirit and scope of the present invention. For example, the present invention has been described in the context of a serial interconnection but one of ordinary skill in the art understands that the present invention could be utilized in a parallel link architecture (where more than one bit of a packet is sent in each cycle) and that use would be within the spirit and scope of the present invention. Accordingly, many modifications may be made by one of ordinary skills in the art without departing from the spirit and scope of present invention, the scope of which is defined by the appended claims.

What is claimed is:

1. A system for efficiently routing data packets, each of the data packets including data information, the system comprising:

a plurality of nodes forming a ringlet; at least one of the plurality of nodes including an optional data path forming a faster path between a first run and a second run in the ringlet for faster transmission of the data packets within the ringlet, and at least one of the plurality of nodes having a scrubber capable of being activated for responding to the data information of the data packets passing therethrough; and means responsive to the data information within the one of the data packets and the location of the faster paths for reducing the length of the path traversed by the data packet within the ringlet.

2. The system of claim 1 in which the reducing means further comprises:

means for providing a path indication of a predetermined number of values, the predetermined number of values being monotonically increasing such that the higher values are removed by the scrubber.

3. The system of claim 2 in which the scrubber is responsible for aging the data packets and stripping aged data packets to ensure that each of the data packets has a finite lifetime.

4. The system of claim 3 in which the ringlet further includes paths that cross-between at the ends of a run in a node on the ringlet.

5. The system of claim 4 in which the portion of nodes that include cross-over paths include a receiver transmitter logic for providing the cross-between paths.

6. The system of claim 5 in which each one of the plurality of nodes is capable of being hardwired in a predetermined fashion to cross-by, transmit and receive.

7. The system of claim 5 in which each one of the plurality of nodes is capable of being dynamically and automatically configurable.

8. The system of claim 5 in which each one of the plurality of nodes further includes elasticity buffers, multiplexers and interface components to facilitate efficient transmission and reception of the data packets.

9. A method for efficiently routing data packets comprising:

a) providing first and second runs;

b) providing a plurality of nodes coupled to the first and second runs; at least one of a plurality of nodes including an optional data path forming a faster path between the first and second runs in the ringlet for faster transmission of the data packets; and c) selecting the faster path for the data packets based upon information within each data packet and the location of the faster path, the information in each data packet including an indication of a run and a path to be traversed by the data packet, the indication being responsive to the data packet passing through the path and a scrubber.

10. The method of claim 6 in which the determining step (c) further comprises the step of:

providing the indication with a predetermined number of values, the predetermined number of values being monotonically increasing such that the last value is removed by the scrubber.

11. The method of claim 10 in which at least one of the plurality of nodes includes the scrubber for aging and removing appropriate data packets.

12. The method of claim 11 in which the ringlet further includes paths that cross-between nodes at the ends of the first and second runs.

13. The method of claim 12 in which the portion of nodes that include cross-through paths include receiver/transmitter logic for providing the cross-through paths.

\* \* \* \* \*